United States Patent
Avis et al.

(10) Patent No.: US 12,025,377 B2
(45) Date of Patent: Jul. 2, 2024

(54) DAMAGE DETECTION SYSTEM AND METHOD OF USE

(71) Applicant: IMERTECH SAS, Paris (FR)

(72) Inventors: Russel N. Avis, Vicq (FR); Jullette Ducup De Saint Paul, Epernay (FR)

( * ) Notice: Subject to any disclaimer, the term of this patent is extended or adjusted under 35 U.S.C. 154(b) by 848 days.

(21) Appl. No.: 16/482,837

(22) PCT Filed: Jan. 31, 2018

(86) PCT No.: PCT/EP2018/052432
§ 371 (c)(1),
(2) Date: Aug. 1, 2019

(87) PCT Pub. No.: WO2018/141809
PCT Pub. Date: Aug. 9, 2018

(65) Prior Publication Data
US 2020/0011603 A1     Jan. 9, 2020

(30) Foreign Application Priority Data

Feb. 1, 2017     (EP) .................................... 17305116

(51) Int. Cl.
| F27D 21/00 | (2006.01) |
| F27B 1/28 | (2006.01) |
| F27B 3/28 | (2006.01) |
| F27D 21/04 | (2006.01) |
| G01N 27/20 | (2006.01) |

(52) U.S. Cl.
CPC ............ *F27D 21/0021* (2013.01); *F27B 1/28* (2013.01); *F27B 3/28* (2013.01); *F27D 21/04* (2013.01); *G01N 27/205* (2013.01); *F27D 2021/0085* (2013.01)

(58) Field of Classification Search
CPC ...... F27B 1/28; F27B 3/28; F27D 2021/0085; F27D 21/0021; F27D 21/04; G01N 27/205
USPC ........ 266/78, 99; 432/32; 373/145, 155, 137
See application file for complete search history.

(56) References Cited

U.S. PATENT DOCUMENTS

| 1,922,029 A * | 8/1933 | Chesnut ................... F27B 3/08 373/145 |
| 2,024,714 A * | 12/1935 | Woodson .................. F27B 3/08 373/130 |
| 2,990,541 A | 6/1961 | Gill |
| 2,990,542 A | 6/1961 | Seitz |
| 3,898,366 A * | 8/1975 | Aurini ...................... F27B 3/12 266/99 |
| 4,107,672 A * | 8/1978 | Van Riemsdijk ......... F17C 3/06 137/551 |
| 4,158,806 A * | 6/1979 | Kotylev .................. G01N 25/04 324/705 |
| 4,365,788 A * | 12/1982 | Block ...................... B22D 2/00 374/142 |
| 4,367,866 A * | 1/1983 | Acker ...................... F27B 3/12 266/286 |
| 7,090,801 B2 * | 8/2006 | Mueller ............... G01N 27/205 266/78 |
| 9,400,137 B2 * | 7/2016 | Prabhu .................... H05B 6/24 |
| 2004/0114663 A1 | 6/2004 | Mueller et al. |
| 2008/0042833 A1 | 2/2008 | Zhou et al. |

FOREIGN PATENT DOCUMENTS

| JP | H-09303971 A | 11/1997 |
| JP | 3 480786 B2 | 12/2003 |

OTHER PUBLICATIONS

International Property India Examination Report dated Apr. 27, 201, in India Application No. 201927031151, 7 pages).
International Search Report and Written Opinion dated Aug. 9, 2018, in International Application No. PCT/EP2018/052432 (17 pgs.).

* cited by examiner

*Primary Examiner* — Jessee R Roe
*Assistant Examiner* — Michael Aboagye
(74) *Attorney, Agent, or Firm* — KUSNER & JAFFE

(57) ABSTRACT

The present invention relates to damage detection systems for refractory linings for molten metal vessels, comprising an electrically conductive grid disposed underneath the surface of the refractory lining closest to a molten metal when in use, one or more electrically conductive electrodes disposed in contact with the molten metal when in use and an electrical power source, wherein the electrically conductive metallic grid and the one or more electrically conductive electrodes are electrically connected to each other, such as to form an open electrical circuit powered by the said electrical power source, and a detected closure of the said electrical circuit during normal use of the molten metal vessel indicates that the said refractory lining is damaged, or the presence of a molten metal during normal operation of the vessel closes the said electrical circuit in case the refractory lining is damaged. The present invention relates to a method for detecting damage in a refractory lining during use, and the use of a damage detection system according to the invention.

9 Claims, No Drawings

DAMAGE DETECTION SYSTEM AND METHOD OF USE

CLAIM FOR PRIORITY

This application is a U.S. national phase entry under 35 U.S.C. § 371 from PCT International Application No. PCT/EP2018/052432, filed Jan. 31, 2018, which claims the benefit of priority of EP Application No. 17305116.0, filed Feb. 1, 2017, from which this application claims priority and all of which are incorporated herein by reference.

FIELD OF THE INVENTION

The present invention relates to systems for detecting damage in refractory linings, as well as methods for detecting damage in refractory lining, such as by use of the system according to the present invention.

BACKGROUND OF THE INVENTION

Refractories are materials having properties that make them suitable for use as heat-resistant barriers in high temperature applications. These materials are useful for example as linings for cupola hearths and siphons, in blast furnaces, main, secondary and tilting runners, and more generally in vessels or vessel spouts, ladles, tundishes, reaction chambers and troughs that contain, direct the flow, or are suitable for facilitating industrial treatment of liquid metals and slags, or any other high temperature liquids, solids and gases.

Unshaped refractory materials have the ability to form a joint-less lining, and are often referred to as monolithics. They are typically manufactured in powdered form and optionally mixed with water prior to application, so they can be installed by casting, spraying and gunning followed by setting and drying, or as dry vibratable mixes, prior to firing. Shaped materials are available as bricks, plates, or the like. All these are useful as refractory linings.

Refractory linings are subject to strong mechanical, thermal and chemical stress during use, as they come into contact with molten metals that have high heat, density and may be chemically corrosive in the case of formation of slag or other materials. Molten metal can also enter any cracks or gaps formed in a refractory lining and cause damage within the actual lining.

In order to improve both safety and cost efficiency in metal casting, improvements in the refractory materials to obtain better chemical, mechanical and/or thermal resistance have been sought for a long time. Other improvements have been introduced in the fixation of refractory linings to external walls, for example in a furnace, through the use of special anchoring or installation of additional sacrificial or protective linings.

However, there will always remain the problem of limited lifetime of the refractory linings. Damage to refractory linings leading to molten metal penetrating the damaged lining through holes, cracks, gaps or the like causes a risk to the safety of the operation of the lining, whether it is installed in a furnace, a ladle, a reaction chamber, or any other application.

For example, EP 1 504 830 A1 discloses an optical or thermal method for gauging the structural integrity of a refractory lining. Further, JP H09-72852 discloses a method for detecting cracks in refractory linings, using infrared imaging of inner wall surfaces of a refractory lining. The temperature distribution on the inner wall of the lining allows the detection of cracks in the lining.

These processes, however, can only be applied while the refractory lining is not in use. In other words, it allows for regular checks of the lining, but it does not provide real-time monitoring of the integrity of a refractory lining.

The state of the art therefore constitutes a problem.

SHORT DESCRIPTION OF THE INVENTION

The present invention is defined in the appended claims.

In particular, the present invention may be embodied by a damage detection system for refractory linings for molten metal vessels, comprising an electrically conductive grid disposed underneath the surface of the refractory lining closest to a metal melt when in use, one or more electrically conductive electrodes disposed in contact with the metal melt when in use, and an electrical power source, wherein the said electrically conductive metallic grid and the said one or more electrically conductive electrodes are electrically connected to each other, such as to form an open electrical circuit powered by the said electrical power source, and wherein a detected closure of the said electrical circuit during normal use of the molten metal vessel indicates that the said refractory lining is damaged. The system according to this invention provides permanent online monitoring of the condition of the refractory lining.

In a further embodiment, the present invention may be embodied by a damage detection system for refractory linings for molten metal vessels, comprising an electrically conductive grid disposed underneath the surface of the refractory lining closest to a molten metal when in use, one or more electrically conductive electrodes disposed in contact with the molten metal when in use, and an electrical power source, wherein the said electrically conductive metallic grid and the said one or more electrically conductive electrodes are electrically connected to each other, such as to form an open electrical circuit powered by the said electrical power source, and wherein the presence of a molten metal during normal operation of the vessel closes the said electrical circuit in case the refractory lining is compromised. The system according to this invention provides permanent online monitoring of the condition of the refractory lining.

According to one embodiment of the present invention, the refractory lining may be a monolithic refractory lining, or a refractory lining composed of discrete pieces, such as refractory bricks of plates. It was found that the system according to the invention may be applied to either type of refractory linings.

According to one embodiment of the present invention, the electrical power source comprises a battery, or it may consist of one or more batteries. It was found that batteries reliably provide sufficient power to operate the damage detection system according to the invention.

According to one embodiment of the present invention, the electrical power source comprises two or more batteries connected in parallel. This type of arrangement affords additional reliability, in case a battery fails.

According to one embodiment of the present invention, a closure of the normally open electrical circuit leads to the triggering of an alarm. The alarm may be an audible alarm, or a visual alarm, or a combination of both. The triggering of an alarm indicates that the monitored refractory lining may have been damaged and allows operators to take any counter-measures, as required.

According to one embodiment of the present invention, in case two or more batteries are connected in parallel, each of the batteries may be connected to a separate alarm. This type of arrangement affords additional reliability, in case a battery fails.

According to one embodiment of the present invention, the system may additionally comprise one or more indicator circuits, which are closed when the electrical power source in normal operating mode. Such indicator circuits allow for monitoring that the detection system is online and functioning. For example, the indicator circuit may be connected to a control light, such as an LED, which indicates that the system is active.

According to one embodiment of the present invention, the system may additionally comprise a switch, which when activated separately closes the normally open electrical circuit, thereby triggering an alarm, if installed. This allows the operator to manually check whether or not the damage detection system as well as the alarm are active and in working condition.

According to one embodiment of the present invention, the grid disposed underneath the surface of the refractory lining may be replaced by an external metallic shell of the molten metal vessel. It was found that such an arrangement is simpler and therefore cheaper to install, in particular in the case of non-monolithic refractory linings made of bricks or plates. At the same time, it is triggered only if the damage in the refractory lining is such that molten metal penetrates all the way to the inner metallic wall of the molten metal vessel.

According to one embodiment of the present invention, the system may additionally comprise a secondary circuit between the grid and the electrical power source, which may be interrupted by a switch. This secondary circuit allows to check that the primary cabling between the grid and the electrical power source is intact, for example by triggering an LED lamp when the switch is closed.

According to one embodiment of the present invention, the system may additionally comprise a secondary circuit between the one or more conductive electrodes and the electrical power source, which may be interrupted by a switch. This secondary circuit allows to check that the primary cabling between the electrodes and the electrical power source is intact, for example by triggering an LED lamp when the switch is closed.

According to further embodiments of the present invention, a damage detection system according to the invention is installed within a refractory lining installed in a molten metal vessel or vessel spout, a ladle, a tundish, a reaction chamber or a trough, or in a cupola hearth a siphon, a blast furnace, or a main, secondary or tilting runner. The said refractory lining and/or molten metal vessel or vessel spout, ladle, tundish, reaction chamber or trough, or cupola hearth, siphon, blast furnace, or main, secondary or tilting runner also forms part of the present invention.

Also part of the present invention is a method for detecting damage in a refractory lining during operation, wherein the method comprises the installation of a damage detection system of the present invention, and the detection of a closure of the electrical circuit contained therein. It was found that effective monitoring of the integrity of a refractory lining could be obtained during operation using that method.

Also part of the present invention is a use of the system according to the present invention in the process of detecting damage in a refractory lining. This use was found to be useful to monitor the integrity of a refractory lining of a molten metal vessel during its operation.

It is understood that the following description concerns exemplary embodiments of the present invention and shall not be limiting the scope of the claims.

DETAILED DESCRIPTION OF THE INVENTION

The present invention according to the appended claims provides a system for detecting any damage in a refractory lining for a molten metal vessel. The system is simple to install and use, and allows for direct online monitoring of the integrity of a refractory lining during its operation with molten metal. The principle of the system lies in that an open electrical circuit is installed, wherein a power source has one pole connected to an electrically conductive grid, which is disposed underneath the surface of the refractory lining to be monitored, and a second pole connected to an electrode which will be in contact with the molten metal during normal operation of the molten metal vessel. Provided that the monitored refractory lining is intact, the open electrical circuit will not be activated. If however there is damage on the monitored refractory lining, this will allow the molten metal during operation to come into electrically conductive contact with the grid, thereby closing the electrical circuit and causing a current to be established in the circuit. If an alarm is connected in the circuit, then an operator may be made aware of the damage in the refractory lining.

According to the present invention, the closure of the open electrical circuit indicates that the refractory lining is damaged to such an extent that molten metal penetrates into the lining. According to the requirements of the operator, the electrically conductive grid may be installed at such a depth relative to the surface of the refractory lining normally in contact with the molten metal, at which impediment to the safety or economic viability of the refractory lining is considered likely. Accordingly, the sensitivity of the system according to the present invention may be adapted according to the operator's requirements. For example, in particular in the case of non-monolithic refractory linings made up of bricks and/or plates or the like, the electrically conductive grid may be placed underneath the said bricks and/or plates, such that the system is triggered only when molten metal penetrates underneath a chosen layer of refractory bricks or plates. In another embodiment, the electrically conductive grid may be placed directly onto the inner side of an external wall of the vessel, or the external wall of the vessel may replace the electrically conductive grid, provided that the inner wall of the vessel itself is electrically conductive.

An advantage of the system according to the present invention lies in that the damage control of a refractory lining is carried out during operation of the refractory lining within a molten metal vessel. Therefore regular checks in between operations of the molten metal vessel are no longer required, and down-time can be reduced. Furthermore, the system is adaptable to the specific requirements of the operator, by placing the electrically conductive grid at the required depth. In the case of cast monolithic refractory linings, the electrically conductive grid may be placed at any depth. In the case of refractory linings assembled from bricks and/or plates, the electrically conductive grid needs to be placed between or underneath a layer as required. It is possible to place the grid under the entire surface, or substantially the entire surface of the monitored refractory lining. Alternatively, one or several grids may be placed only at specific areas which are considered to be most at risk from damage. Either alternative is part of the present invention.

The one or more electrically conductive electrodes employed in the present invention are placed such that they are in contact with the molten metal during normal operation of the vessel. For example, one electrode may penetrate the wall of the vessel at a level below the level to which the vessel is normally filled during operation. Alternatively, an electrode may protrude through a base of the said vessel such that it is in contact with the molten metal poured into the base of the vessel. This leads to an activation of the electrode at the start of pouring molten metal into the vessel. Alternatively, an electrode may be placed penetrating into the molten metal vessel through a large opening at the top of the vessel. For example, an electrode may only be introduced through a top opening after a vessel has been filled with molten metal, thereby only monitoring damage at a specific time during the operation. In such a case, an electrode may be removed after testing.

The power source employed in the present invention may be a battery, such as for example a standard 12V battery. Alternatively, the system may be powered by other power sources, such as for example mains electricity (AC), accumulators (DC), solar panels, or any other power source known to the skilled person in the art. Several power sources may be installed in parallel, in order to allow additional reliability of the system in case one power source is exhausted or out of order. For example two batteries may be installed in parallel, or a battery and a mains connection may be installed in parallel, whereas either of the power sources may be functioning as a back-up for the other power source.

When the electrical circuit of the damage detection system of the present invention is closed, normally by the infiltration of the refractory lining with molten metal, bringing into contact the electrically conductive grid with the electrode, an alarm is normally triggered. The alarm may be an audible alarm such as a horn, a beep, a whistle, a bell or the like. This draws the operator's attention to the fact that the refractory lining of the molten metal vessel may be damaged, and allow them to take adequate measures. The alarm may alternatively be a visible alarm, such as a flashing light, an LED, a moving object or the like, also drawing an operator's attention. The alarm may be a combination of several visible and/or audible signals. If several power sources are employed in parallel, each power source may trigger a separate alarm, or, alternatively, each power source may trigger several alarms.

Various control or indicator circuits may be integrated into the damage detection system according to the present invention in order to monitor the activity of the damage control system.

For example, an indicator circuit may be installed, which is triggered when the electrical power source is in normal functioning mode. This may for example be a circuit directly linking the pole of the power source connected to the electrically conductive grid to the pole of the power source linked to the one or more electrodes, via an indicator. The indicator may, for example, be a light source such as an LED. This "control LED" will show that an electrical current is flowing in the indicator circuit and that the power source is in functioning mode. The indicator circuit may further comprise a switch to turn on and off the indicator circuit control signal.

A further indicator circuit comprising a switch may be installed to provide an optional short-cut to the main detection circuit. In that case, the power source provides power to the alarm, if installed, when the switch is triggered, without actual damage to the refractory lining. This allows the operator to control the functioning of the alarm.

Further indicator circuits are envisaged to connect the electrically conductive grid or the one or more electrodes to a secondary power source, with a switch, in order to check the integrity of the connections of the respective parts to the main power source of the damage detection system.

A method of detecting damage in a refractory lining of a molten metal vessel during operation, and the use of a damage detection system according to the present invention also form part of the present invention.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A damage detection system for refractory linings for molten metal vessels, comprising:
   an electrically conductive grid disposed underneath a surface of a refractory lining closest to a molten metal when in use;
   one or more electrically conductive electrodes disposed in contact with the molten metal when in use; and
   an electrical power source;
   wherein the electrically conductive metallic grid and the one or more electrically conductive electrodes are electrically connected to each other, such as to form an open electrical circuit powered by the electrical power source,
   wherein a detected closure of the electrical circuit during normal use of the molten metal vessel indicates that the refractory lining is damaged,
   wherein the refractory lining is installed in a molten metal vessel or vessel spout, a ladle, a tundish, a reaction chamber or a trough, or in a cupola hearth or a siphon, a blast furnace, or a main, secondary or tilting runner,
   wherein the electrical power source comprises two batteries connected in parallel, and
   wherein the detected closure of the electrical circuit leads to a triggering of an alarm and wherein each of the batteries connected in parallel is associated with a separate alarm.

2. A damage detection system according to claim 1, wherein the refractory lining is a monolithic refractory lining.

3. A damage detection system according to claim 1, wherein the electrical power source comprises a battery.

4. A damage detection system according to claim 1, further comprising one or more indicator circuits triggered when the electrical power source is in a normal functioning mode.

5. A damage detection system according to claim 1, further comprising a switch artificially short-circuiting the open electrical circuit.

6. A damage detection system according to claim 1, wherein the electrically conductive electrodes are electrically connected to a steel shell of the molten metal vessel.

7. A damage detection system according to claim 1, further comprising a secondary electrical connection between the electrically conductive grid and the electrical power source, wherein the secondary electrical connection may be interrupted by a switch.

8. A damage detection system according to claim 1, further comprising a secondary circuit between all of the one or more electrically conductive electrodes and the electrical power source, which may be interrupted by a switch.

9. A damage detection system for refractory linings for molten metal vessels, comprising:

an electrically conductive grid disposed underneath a surface of the refractory lining closest to molten metal when in use;

one or more electrically conductive electrodes disposed in contact with the molten metal when in use; and an electrical power source;

wherein the electrically conductive metallic grid and the one or more electrically conductive electrodes are electrically connected to each other to form an open electrical circuit powered by the electrical power source, wherein the presence of a molten metal during normal operation of the vessel closes the electrical circuit in case the refractory lining is damaged, wherein the refractory lining is installed in the molten metal vessel or vessel spout, a ladle, a tundish, a reaction chamber or a trough, or in a cupola hearth or a siphon, a blast furnace, or a main, secondary or tilting runner, and wherein the electrical power source comprises two batteries connected in parallel, and wherein the closure of the electrical circuit leads to a triggering of an alarm and wherein each of the batteries connected in parallel is associated with a separate alarm.

* * * * *